United States Patent
Nomura et al.

(10) Patent No.: US 8,923,613 B2
(45) Date of Patent: Dec. 30, 2014

(54) IMAGE COMPRESSION DEVICE, IMAGE COMPRESSION METHOD, INTEGRATED CIRCUIT, PROGRAM, AND PICTURE DISPLAY APPARATUS

(75) Inventors: Kazuhiro Nomura, Osaka (JP); Takashi Nishimura, Osaka (JP)

(73) Assignee: Panasonic Corporation, Osaka (JP)

( * ) Notice: Subject to any disclaimer, the term of this patent is extended or adjusted under 35 U.S.C. 154(b) by 126 days.

(21) Appl. No.: 13/805,543

(22) PCT Filed: Apr. 13, 2012

(86) PCT No.: PCT/JP2012/002570
§ 371 (c)(1),
(2), (4) Date: Dec. 19, 2012

(87) PCT Pub. No.: WO2012/140904
PCT Pub. Date: Oct. 18, 2012

(65) Prior Publication Data
US 2013/0094777 A1 Apr. 18, 2013

(30) Foreign Application Priority Data
Apr. 15, 2011 (JP) ................. 2011-090771

(51) Int. Cl.
*G06K 9/36* (2006.01)
*H04N 19/154* (2014.01)
*H04N 19/186* (2014.01)
*H04N 19/115* (2014.01)
*H04N 19/137* (2014.01)
*H04N 1/64* (2006.01)

(52) U.S. Cl.
CPC ............... *G06K 9/36* (2013.01); *H04N 19/002* (2013.01); *H04N 19/00315* (2013.01); *H04N 19/0006* (2013.01); *H04N 19/00145* (2013.01); *H04N 1/646* (2013.01)
USPC ............ 382/166; 382/162; 382/232; 382/233

(58) Field of Classification Search
CPC ....... G06T 9/005; G06T 11/001; G06T 7/408; G06T 5/001; H04N 1/64; H04N 7/26148; H04N 7/26292; H04N 7/30; H04N 1/6058; H04N 9/045
USPC .............. 382/162, 166, 232, 233; 348/396.1; 358/539; 375/240.2, 204.01, 240.03, 375/E7.047, E7.001, E7.139, E7.232, 375/E7.144
See application file for complete search history.

(56) References Cited

U.S. PATENT DOCUMENTS

| 4,947,249 A | 8/1990 | Kondo | .................... 375/240.12 |
| 4,974,071 A | 11/1990 | Maeda | ......................... 358/539 |

(Continued)

FOREIGN PATENT DOCUMENTS

| JP | 63-269684 | 11/1988 | ............... H04N 1/41 |
| JP | 2-105790 | 4/1990 | ............... H04N 7/13 |

(Continued)

OTHER PUBLICATIONS

International Search Report issued Jul. 10, 2012 in International (PCT) Application No. PCT/JP2012/002570.

*Primary Examiner* — Anh Do
(74) *Attorney, Agent, or Firm* — Wenderoth, Lind & Ponack, L.L.P.

(57) ABSTRACT

Degradation in image quality of color difference components is to be suppressed. Provided is an image compression device that performs fixed length compression of data to be compressed composed of a plurality of components including a luminance component. The image compression device includes a code amount allocation unit configured to determine, according to the luminance component, the code amount to be allocated to each of the plurality of components such that a total of the code amount allocated to each of the components remains constant, and a compression unit configured to compress each of the plurality of components in accordance with the code amount determined by the code amount allocation unit.

12 Claims, 8 Drawing Sheets

(56) References Cited

U.S. PATENT DOCUMENTS

| | | | |
|---|---|---|---|
| 5,359,438 A | 10/1994 | Maeda | 358/539 |
| 5,844,608 A | 12/1998 | Yu et al. | 375/240.01 |
| 6,144,763 A * | 11/2000 | Ito | 382/166 |
| 6,668,021 B2 * | 12/2003 | Shimizu et al. | 375/240.2 |
| 7,035,459 B2 | 4/2006 | Ishiga | 382/166 |
| 7,146,039 B2 | 12/2006 | Ishiga | 382/166 |
| 7,362,807 B2 | 4/2008 | Kondo et al. | 375/240.16 |
| 2003/0026477 A1 | 2/2003 | Ishiga | 382/166 |
| 2004/0086047 A1 | 5/2004 | Kondo et al. | 375/240.16 |
| 2005/0033000 A1 | 2/2005 | Ohta et al. | 526/348.1 |
| 2006/0140476 A1 | 6/2006 | Ishiga | 382/166 |
| 2008/0069227 A1 | 3/2008 | Kondo et al. | 375/240.16 |
| 2008/0069228 A1 | 3/2008 | Kondo et al. | 375/240.16 |
| 2008/0069229 A1 | 3/2008 | Kondo et al. | 375/240.16 |
| 2008/0069230 A1 | 3/2008 | Kondo et al. | 375/240.16 |
| 2010/0118969 A1 | 5/2010 | Kondo et al. | 375/240.16 |
| 2010/0220936 A1 | 9/2010 | Yamaguchi et al. | 382/238 |
| 2010/0303149 A1 | 12/2010 | Yasuda et al. | 375/240.03 |

FOREIGN PATENT DOCUMENTS

| | | | | |
|---|---|---|---|---|
| JP | 6-62431 | | 3/1994 | H04N 11/04 |
| JP | 2001-506094 | | 5/2001 | H04N 7/36 |
| JP | 2003-47024 | | 2/2003 | H04N 11/04 |
| JP | 2004-96705 | | 3/2004 | H04N 7/32 |
| JP | 2004328406 A | * | 11/2004 | H04N 1/41 |
| JP | 2007019878 | * | 1/2007 | H04N 1/04 |
| JP | 2007-28394 | | 2/2007 | H04N 1/41 |
| JP | 2010-4514 | | 1/2010 | H04N 7/32 |
| WO | 98/26606 | | 6/1998 | H04N 7/50 |
| WO | 2009/110559 | | 9/2009 | H04N 7/32 |

* cited by examiner

IMAGE COMPRESSION DEVICE, IMAGE COMPRESSION METHOD, INTEGRATED CIRCUIT, PROGRAM, AND PICTURE DISPLAY APPARATUS

TECHNICAL FIELD

The present invention relates to an image compression device, and more particularly to an image compression device used for reducing amount of data to be stored in a memory.

BACKGROUND ART

In recent years, the displays provided in TV sets and mobile apparatuses have shown remarkable progress in resolution level. Through the last decade, in which the high-vision broadcasting started and the Blu-ray Disc appeared on the market, the resolution of the display has evolved from SD (for example, 720×480) to HD (for example, 1366×768), and then to Full HD (for example, 1920×1080).

However, the progress in resolution of the display naturally leads to an increase in amount of image data to be outputted to the display. In addition, the image processing unit that outputs the image to the display is required to carry a frame memory having a larger capacity for temporarily storing the outputted data, and to utilize a wider memory bandwidth. With the increase in data amount, such issues as an increase in number of external memories to be connected and in power consumption have become more critical.

Here, a popular digital television (DTV) system includes a decoder block and an image signal processing block.

The decoder block decodes stream data based on a standard such as MPEG2 or H.264 and writes the image (frame) data in a memory.

The image signal processing block reads the image data written in the memory and performs image processing such as resizing and upgrading of image quality. The image signal processing block also synthesizes an on-screen display (OSD) and a plurality of motion pictures. The image signal processing block temporarily writes the image data to be subjected to the image processing or synthesizing in the memory, and reads out and outputs the processed image data when such data is required.

More specifically, in the case where a 24-bit full-color picture having a resolution of 1080 p (1920×1080, 60 fps) is to be processed, the necessary bandwidth per frame is approximately 360 MB/s. Further, in the case where the picture is subjected to a complicated image processing, such as synthesis of a plurality of motion pictures, a considerably higher memory bandwidth is required because of the significant increase in number of writing times and reading times in and out of the memory. In such a case, the DTV system has to have a plurality of high-frequency memories having a bandwidth of several GB/s or higher, which naturally leads to an increase in cost.

Accordingly, compressing the image data before storing the image data in the memory to thereby reduce the amount of the image data to be stored therein allows the memory bandwidth to be reduced and, for example, allows the number of memories to be installed to be reduced and a memory of a lower frequency to be employed, which contributes to reducing the cost.

Some conventional image compression devices are configured to divide image data into a plurality of image blocks and compress each of the image blocks. In this case, color difference components contained in the data set value of the image block are subsampled (decimated) depending on whether the image block contains a CG edge, and the data set value obtained through the subsampling is encoded by a predictive coding method (for example, see PTL 1). FIG. 11 is a block diagram showing a configuration of the image compression device disclosed in PTL 1.

The image compression device according to PTL 1 converts the color space of the inputted image data into luminance components and color difference components, and modifies (reduces) the resolution with respect to a part of the plurality of components, in accordance with gradation increments in the inputted image data. The image compression device according to PTL 1 is configured to reduce the resolution of the components that are not largely affected by the reduction in resolution, such as Cb components and Cr components of image data having YCbCr color space, and B components of image data having an RGB color space.

CITATION LIST

Patent Literature

[PTL 1] Japanese Unexamined Patent Application Publication No. 2007-28394

SUMMARY OF INVENTION

Technical Problem

As stated above, the image compression device according to PTL 1 increases the compression ratio by the subsampling (in other words, decimation or reduction in resolution) of some components that are less likely to exhibit the impact of the reduction in resolution. Therefore, for example in digital broadcasting, in which the image data is composed of luminance components and color difference components and the color difference components are decimated in advance, the color difference components less likely to exhibit the impact of the reduction in resolution are further decimated to an unnecessary level, which may result in degradation in image quality.

Accordingly, an object of the present invention is to provide an image compression device capable of compressing image data with minimal degradation in image quality, despite color difference components of the image data having been subsampled in advance.

Solution to Problem

In an aspect, the present invention provides an image compression device that performs fixed length compression of data to be compressed composed of a plurality of components including a luminance component. The image compression device includes a code amount allocation unit configured to determine, according to the luminance component, the code amount to be allocated to each of the plurality of components such that a total of the code amount allocated to each of the components remains constant, and a compression unit configured to compress each of the plurality of components according to the code amount determined by the code amount allocation unit.

Advantageous Effects of Invention

The image compression device configured as above enables compression of image data to be performed with minimal degradation in image quality, despite color difference components of the image data having been subsampled in advance.

DESCRIPTION OF EMBODIMENTS

Outline of the Present Invention

Figure 1:
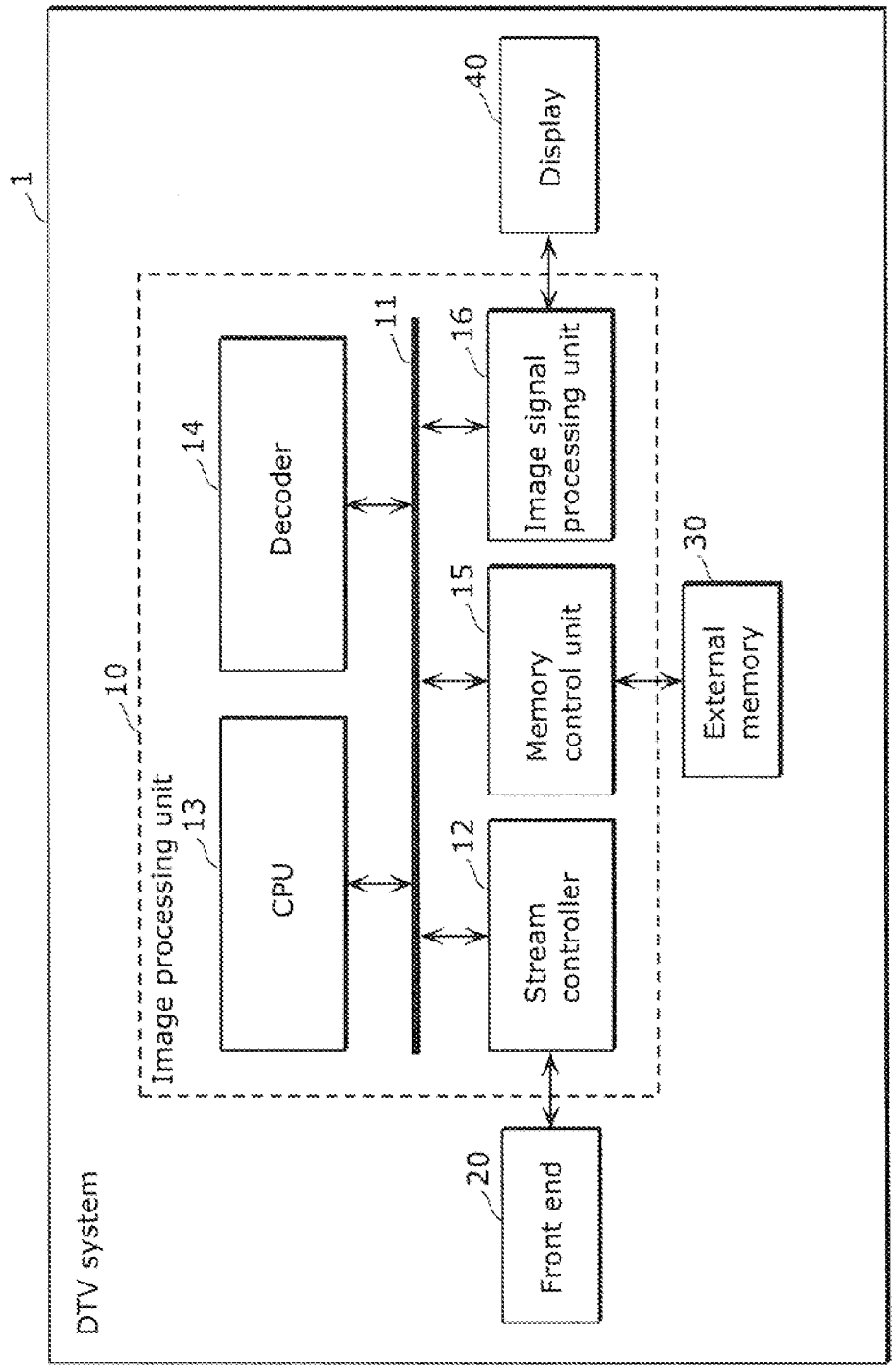
FIG. 1 is a block diagram showing a configuration example of a picture display apparatus according to the present invention.

An image compression device according to an aspect of the present invention performs fixed length compression of data to be compressed composed of a plurality of components including a luminance component. The image compression device includes a code amount allocation unit configured to determine, according to the luminance component, the code amount to be allocated to each of the plurality of components such that a total of the code amount allocated to each of the components remains constant, and a compression unit configured to compress each of the plurality of components according to the code amount determined by the code amount allocation unit.

The image compression device thus configured allows, for example in the case where fluctuation of the luminance components is small in the fixed length compression, the allocation of the code amount to the remaining components (such as color difference components, hue components, and chroma components) can be increased. Although the luminance components more visibly exhibit the impact of degradation than the other components, in the case where the fluctuation is small the luminance components can be prevented from the degradation or from visibly exhibiting the degradation, despite reducing the code amount to be allocated. Thus, the image compression device configured as above reduces the code amount to be allocated to the luminance components and increases the code amount to be allocated to the remaining components when the fluctuation of the luminance components is small, and can therefore suppress the reduction in resolution of other components, without allowing the degradation of the luminance components to be visualized.

With the image compression device according to PTL 1, for example in the case where the color difference components are decimated, transition of colors is more prone to become uneven in a region with color gradation, and the image is more prone to blur in a region of a color edge. The image compression device proposed above allows, in contrast, the code amount for the color difference components to be increased, especially in a region of color gradation or color edge where the fluctuation of the luminance components is relatively small, thereby effectively suppressing the noise.

In the foregoing image compression device, the data to be compressed may be image data corresponding to one frame, or an image block formed by dividing the image data corresponding to one frame into a predetermined number of pixels.

In addition, for example, the code amount allocation unit may include a difference calculation unit configured to calculate, with respect to each of pixels constituting the data to be compressed, an absolute value of a difference between the luminance component of a first pixel and that of a second pixel adjacent to the first pixel, and may determine the code amount to be allocated according to a maximum absolute value of the difference calculated by the difference calculation unit.

For example, the code amount allocation unit may further include a comparison unit configured to compare the maximum absolute value of the difference calculated by the difference calculation unit with a predetermined threshold, and adopt a first code amount as the code amount to be allocated to the luminance component when the maximum absolute value is equal to or lower than the threshold and adopt a second code amount as the code amount to be allocated to the luminance component when the maximum absolute value is higher than the threshold.

Further, for example, the code amount allocation unit may be configured to determine the code amount to be allocated such that the code amount to be allocated to the plurality of components other than the luminance component in the case of allocating the first code amount to the luminance component becomes larger than the code amount to be allocated to the plurality of components other than the luminance component in the case of allocating the second code amount to the luminance component.

Further, for example, the code amount allocation unit may be configured to determine the code amount to be allocated on the basis of a characteristic of the data to be compressed, in addition to the luminance component.

Further, for example, the code amount allocation unit may include a difference calculation unit configured to calculate, with respect to each of pixels constituting the data to be compressed, an absolute value of a difference between the luminance component of a first pixel and that of a second pixel adjacent to the first pixel, and may determine the code amount to be allocated such that the smaller code amount is allocated to the luminance component the smaller the absolute value of the difference between the luminance components is, and the larger the decimation amount of components in the data to be compressed other than the luminance component is.

Still further, for example, the compression unit may include an encoding unit configured to perform a plurality of encoding processes different from each other to thereby generate a plurality of encoded data, a decoding unit configured to decode the plurality of encoded data to thereby generate a plurality of decoded data, a compression mode decision unit configured to calculate, with respect to each of the plurality of decoded data, a difference between the decoded data and the data to be compressed and designate one of the plurality of encoded data on the basis of the difference, and a selection unit configured to select the encoded data designated by the compression mode decision unit and output the encoded data.

Still further, for example, the comparison unit may be configured to determine the code amount to be allocated to the luminance component through comparison between the maximum absolute value of the difference and the threshold determined on the basis of a maximum error produced upon applying the plurality of encoding processes to the luminance component.

An image compression method according to another aspect of the present invention may be employed for performing fixed length compression of data to be compressed composed of a plurality of components including a luminance component. The image compression method may include determining, according to the luminance component, the code amount to be allocated to each of the plurality of components such that a total of the code amount allocated to each of the components remains constant, and compressing each of the plurality of components according to the code amount determined by the code amount allocation unit.

An integrated circuit according to still another aspect of the present invention may be used in an image compression device that performs fixed length compression of data to be compressed composed of a plurality of components including a luminance component. The integrated circuit may include a code amount allocation unit configured to determine, according to the luminance component, the code amount to be allocated to each of the plurality of components such that a total of the code amount allocated to each of the components remains constant, and a compression unit configured to compress each of the plurality of components according to the code amount determined by the code amount allocation unit.

A program according to still another aspect of the present invention may be used for causing a computer to perform fixed length compression of data to be compressed composed of a plurality of components including a luminance component. The program may include determining, according to the luminance component, the code amount to be allocated to each of the plurality of components such that a total of the code amount allocated to each of the components remains constant, and compressing each of the plurality of components according to the code amount determined by the code amount allocation unit.

A picture display apparatus according to still another aspect of the present invention may include an image compression device that performs fixed length compression of data to be compressed composed of a plurality of components including a luminance component. The picture display apparatus may include a memory in which compressed data obtained through the fixed length compression of the data to be compressed performed by the image compression device is to be stored, and an image signal processing unit configured to perform a predetermined image processing on the basis of decoded data obtained by decoding the compressed data and output the data obtained through the image processing to a predetermined display panel. The image compression device may include a code amount allocation unit configured to determine, according to the luminance component, the code amount to be allocated to each of the plurality of components such that a total of the code amount allocated to each of the components remains constant, and a compression unit configured to compress each of the plurality of components according to the code amount determined by the code amount allocation unit, and output the compressed components to the memory.

Hereafter, an embodiment of the present invention will be described in details referring to the drawings. The following embodiment represents a preferred example of the present invention. Constituents, positions thereof and relationships therebetween, processes, and sequences thereof described in the embodiment are merely exemplary, and in no way intended to limit the present invention. The constituents described in the embodiment but not set forth in independent claims representing the most superordinate concept of the present invention are to be construed as optional constituents that may achieve a more preferable form.

Embodiment

Referring to FIGS. 1 to 5, an embodiment of the image compression device configured as above will be described. The following embodiment represents the case where the image compression device is incorporated in a DTV system which exemplifies the picture display apparatus.

[Configuration of DTV System]

First, a configuration of the DTV system 1 shown in FIG. 1 will be described. FIG. 1 is a block diagram showing the configuration of the DTV system 1 including the image compression device according to this embodiment.

As shown in FIG. 1, the DTV system 1 includes an image processing unit 10, a front end 20, an external memory 30, and a display 40.

The front end 20 is composed of picture input devices such as a tuner and a communication module, and selects a desired transport stream from digital broadcast waves being received, for example a transport stream of a selected channel and outputs the selected stream to a stream controller 12 of the image processing unit 10.

The external memory 30 is constituted of a RAM or FIFO, and serves to write and read data, in response to a request from a memory control unit 15 of the image processing unit 10.

The display 40 is the display panel of the DTV system, and receives display data from the DTV system 1, in this embodiment.

The image processing unit 10 serves to generate the display data upon receipt of the stream data outputted from the front end 20 and includes, as shown in FIG. 1, the stream controller 12, a CPU 13, a decoder 14, a memory control unit 15, and an image signal processing unit 16. Here, the stream controller 12, the CPU 13, the decoder 14, the memory control unit 15, and the image signal processing unit 16*b* are connected via a bus line 11.

The stream controller 12 is predominantly constituted of a desciambler or a transport decoder. The transport stream outputted from the front end 20 is encrypted using stream cryptography, and therefore the stream controller 12 removes the stream encryption on the basis of copyright information of the transport stream. The stream controller 12 then extracts a desired video packet and sound packet, and an additional information packet including program information for example, from the transport stream now released from the stream encryption.

The CPU 13 is typically constituted of a processor, which is hardware, and controls the entire system including the image signal processing unit 16.

The decoder 14 decodes the picture packet and the sound packet to thereby acquire a video signal and audio signal, and outputs the signals to the image signal processing unit 16.

The memory control unit 15 is directly connected to the external memory 30 without the intermediation of the bus line 11, and handles memory access requests from the stream controller 12, the CPU 13, the decoder 14, and the image signal processing unit 16.

Figure 2:
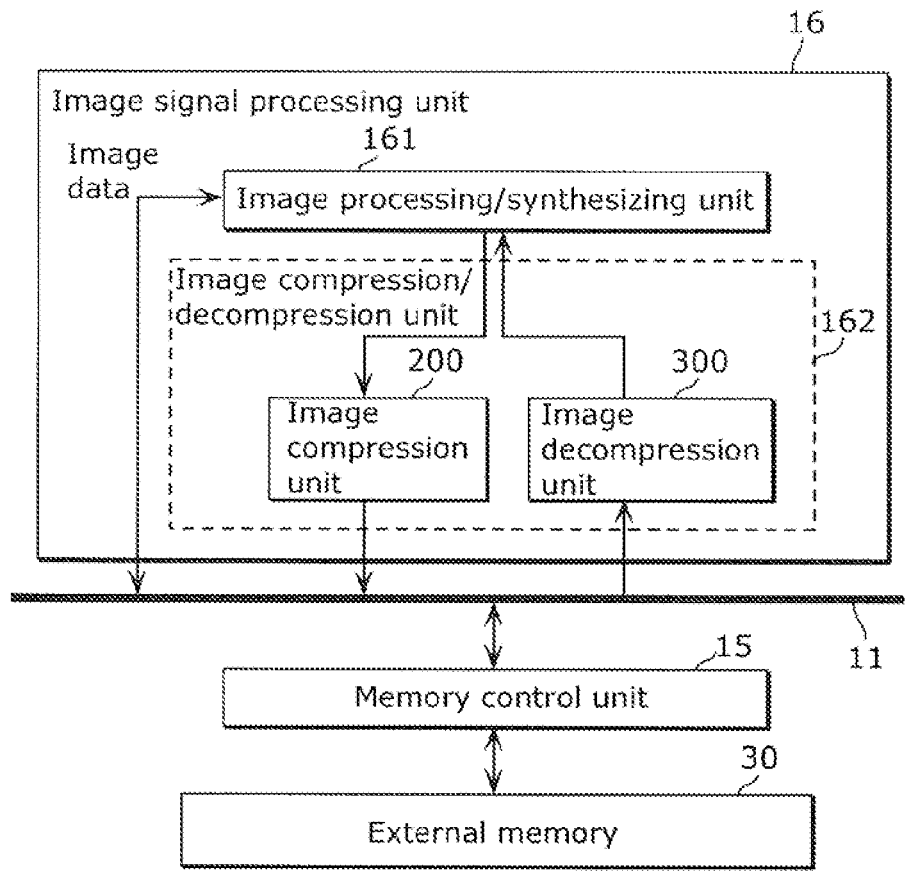
FIG. 2 is a block diagram showing a configuration example of image signal processing unit in the picture display apparatus.

The image signal processing unit 16 receives the video signal and audio signal from the decoder 14 and performs image processing and synthesizing with respect to the image represented by the video signal and includes, as shown in FIG. 2, an image processing/synthesizing unit 161 and an image compression/decompression unit 162. FIG. 2 is a block diagram showing a configuration of the image signal processing unit 16.

The image processing/synthesizing unit 161 performs image processing such as resizing and upgrading of image quality, as well as synthesizing of an OSD or a plurality of motion pictures, with respect to the image represented by the video signal inputted from the decoder 14 through the bus line 11, and outputs the video signal that has undergone the image processing and synthesizing to the display 40.

The image compression/decompression unit 162 includes an image compression unit 200 that performs the fixed length compression of the data received from the image processing/synthesizing unit 161, and an image decompression unit 300 that decompresses the compressed data processed by the fixed length compression, as shown in FIG. 2. The image compression/decompression unit 162 is provided, as shown in FIG. 2, at the interface portion of the image signal processing unit 16 with the bus line 11. In this embodiment, as will be subsequently described, the compression and decompression of the image data performed by the image compression/decompression unit 162 before the image data is stored in the external memory 30 enables reduction in amount of data transmitted on the bus line 11, and reduction in bandwidth and capacity of the external memory 30.

The image compression unit 200 performs the fixed length compression of the data to be compressed composed of a plurality of components including a luminance component, with respect to each block. Compressing the data with respect to each block contributes to reducing the arithmetic load for designing the hardware to be implemented. In addition, performing the fixed length compression with respect to each block allows a worst compression rate of the overall image to be secured.

Figure 3:
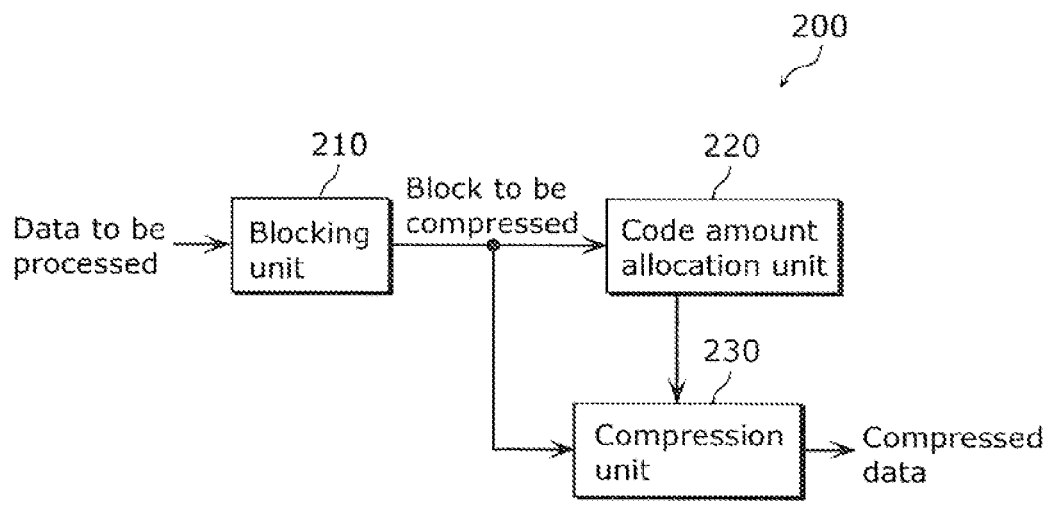
FIG. 3 is a block diagram showing a configuration example of an image compression unit included in the image signal processing unit.

FIG. 3 is a block diagram showing a configuration of the image compression unit 200. As shown in FIG. 3, the image compression unit 200 includes a blocking unit 210 that divides the inputted data into a plurality of blocks to be compressed (corresponding to the data to be compressed) having a predetermined number of pixels, a code amount allocation unit 220 that allocates, with respect to each block, a code amount to each component on the basis of the luminance component of the pixels constituting the block to be compressed, and a compression unit 230 that compresses each component according to the allocated code amount.

The code amount allocation unit 220 determines, according to the luminance component, the code amount to be allocated to each of the plurality of components such that a total of the code amount allocated to each of the components remains constant.

Figure 4:
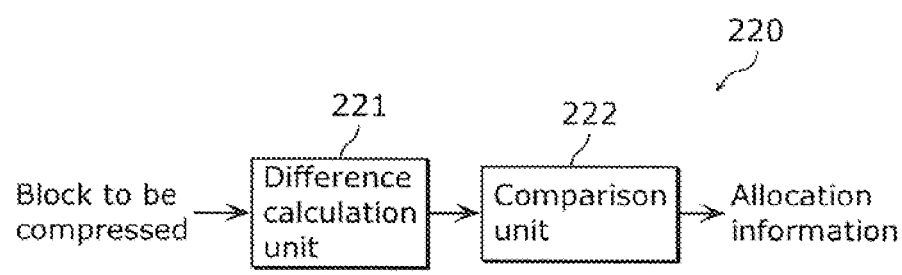
FIG. 4 is a block diagram showing a configuration example of a code amount allocation unit included in the image compression unit.

FIG. 4 is a block diagram showing a configuration of the code amount allocation unit 220. As shown in FIG. 4, the code amount allocation unit 220 includes a difference calculation unit 221 that calculates a difference absolute value between a luminance value of a pixel in the block and a luminance value of an adjacent pixel, and a comparison unit 222 that selects a largest one of the difference absolute values of the plurality of pixels constituting the block as the difference absolute value of that block and compares the difference absolute value of the block with a predetermined threshold to thereby determine the allocation of the code amount.

The compression unit 230 is configured to perform the fixed length compression with respect to each component of the pixel data.

Figure 5:
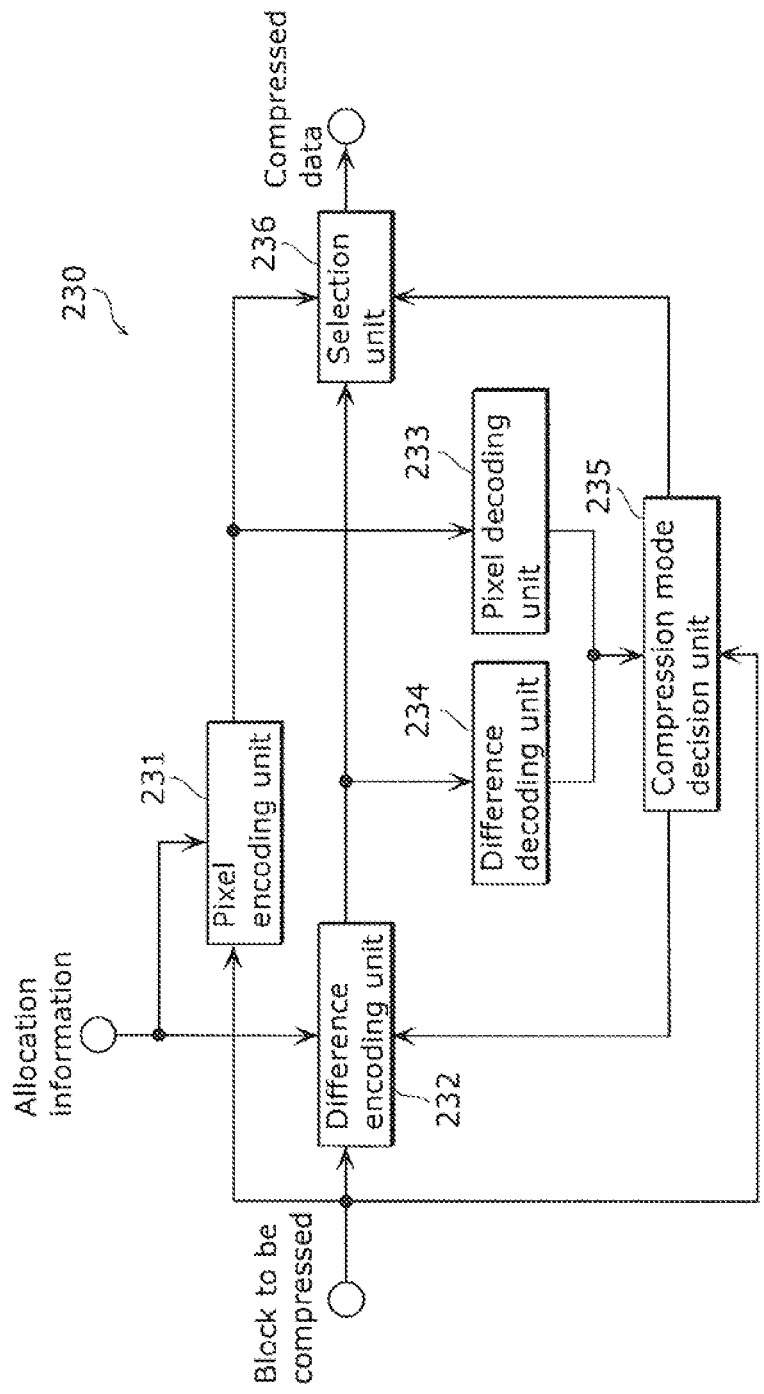
FIG. 5 is a block diagram showing a configuration example of a compression unit included in the image compression unit.

FIG. 5 is a block diagram showing a configuration of the compression unit 230. As shown in FIG. 5, the compression unit 230 includes a pixel encoding unit 231, a difference encoding unit 232, a pixel decoding unit 233, a difference decoding unit 234, a compression mode decision unit 235, and a selection unit 236.

The pixel encoding unit 231 performs the fixed length encoding (compression) with respect to the pixel value of the plurality of pixels constituting the block. The difference encoding unit 232 performs the fixed length encoding with respect to the difference absolute values between each of the plurality of pixels and the adjacent pixel in the block. The pixel decoding unit 233 decodes the compressed data subjected to the fixed length compression in the pixel encoding unit 231, to thereby generate decoded data. The difference decoding unit 234 decodes the compressed data subjected to the fixed length compression in the difference encoding unit 232, to thereby generate decoded data. The compression mode decision unit 235 compares the error between the decoded data generated by the pixel decoding unit 233 and the data of the corresponding pixel (inputted pixel data) in the block to be compressed with the error between the decoded data generated by the difference encoding unit 232 and the inputted pixel data, and identifies which of the pixel encoding unit 231 and the difference encoding unit 232 has outputted the compressed data corresponding to the decoded data that has produced the smaller error. The selection unit 236 selects the compressed data outputted from the encoding unit identified by the compression mode decision unit 235 to have provided the smaller error, and outputs the compressed data accompanied with coding information indicating the encoding unit corresponding to the selected compressed data, to the memory control unit 15.

The image decompression unit 300 decodes the compressed data read out from the external memory 30 by the decoding method corresponding to the encoding method indicated by the coding information, and outputs the decoded data to the image processing/synthesizing unit 161.

Here, although the image compression/decompression unit 162 is provided at the interface portion of the image signal processing unit 16 in this embodiment, a different configuration may be adopted. It suffices that the image compression/decompression unit 162 be provided at a position that allows the data received from the image processing/synthesizing unit 161 to be subjected to the fixed length compression before being stored in the external memory 30, for example at the interface portion of the memory control unit 15 with the bus line 11. Thus, utilizing the image compression/decompression unit 162 so as to perform the fixed length compression before the data is stored in the external memory 30 and to decompress the compressed data subjected to the fixed length compression and read out from the external memory 30 before the image processing enables the amount of data stored in the external memory 30 as well as the memory bandwidth thereof to be reduced.

[Operation of Image Compression Unit 200]

Figure 6:
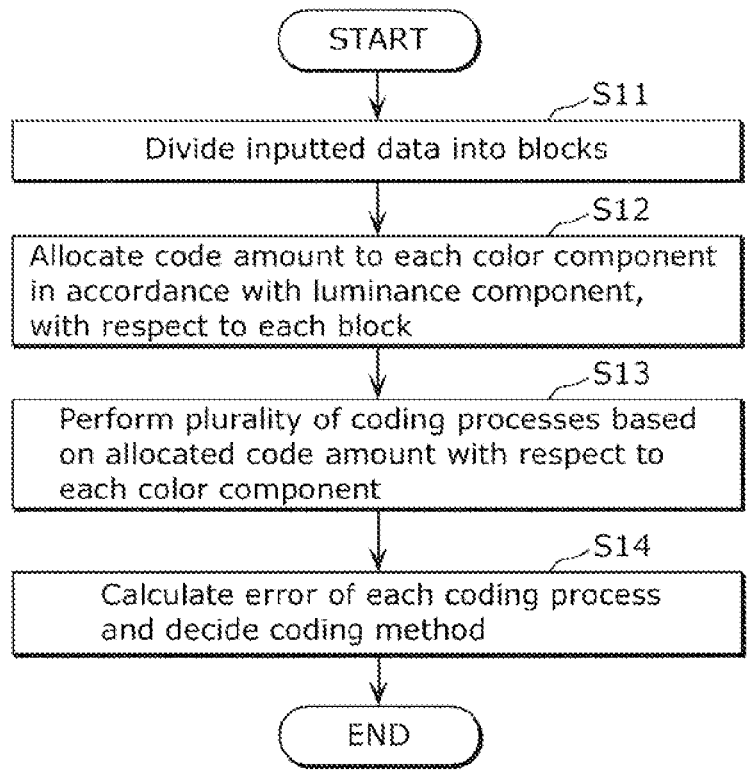
FIG. 6 is a flowchart showing an image compression method for performing fixed length compression with respect to data to be compressed composed of a plurality of components including a luminance component.

Referring now to FIG. 6, the operation of the image compression unit 200 will be described on the basis of specific numerical values. FIG. 6 is a flowchart showing the operation process of the image compression unit 200.

In this embodiment, it will be assumed as the premise that the pixel data of the pixels constituting the block to be compressed possesses each component of the color space with an accuracy of 10 bits. The color space is YCbCr color space in this embodiment, and the pixel data possesses two components namely a luminance component (Y) and a color difference component (Cb and Cr). Since the data amount of each component is 10 bits, the data amount of one pixel is 20 bits. In this embodiment, in addition, the pixel data is expressed in a 4:2:2 format in which the sampling ratio between the luminance component CO and the color difference component (Cb and Cr) of the relevant color space (Y:Cb:Cr) is 4:2:2.

Further, the target compression ratio in this embodiment is 50%. In other words, the pixel data of 20 bits is compressed to 10 bits. Accordingly, the code amount allocation unit 220 of the image signal processing unit 16 allocates the code amount to the luminance component and the color difference component such that the total of the allocated code amount becomes 10 bits. In this embodiment, it will be assumed that the code amount is allocated to the luminance component and the color difference component in a ratio of (4 bits:6 bits) or (6 bits:4 bits).

In this embodiment, further, the data to be compressed by the image compression/decompression unit 162 of the image signal processing unit 16 is not the data itself employed for displaying the TV broadcasting on the display 40, but the data to be processed used as reference when the image processing is performed. More specifically, the data to be processed is, for example, the data utilized only within the DTV system 1, which may include the data of the adjacent pixel around a block that is the target of intra-frame prediction. Here, since the data to be compressed is not the image data to be directly displayed on the display 40, degradation of the image quality to a certain degree is not remarkably reflected in the image that appears on the display 40. Accordingly, it may be presumed that further performing the fixed length compression (fixed length encoding) with respect to the data to be compressed does not considerably affect the image that appears on the display 40. The image signal processing unit 16 performs the fixed length compression and decompression of such data to be processed, and thereby reduce the amount of data to be stored in the external memory 30 without incurring degradation in quality of the image that appears on the display 40. In addition, since the fixed length compression is a simple method, the compression can be performed with a small amount of computation.

When the data to be compressed is inputted to the image compression unit 200, the blocking unit 210 divides the inputted data to be compressed into a plurality of blocks to be compressed each including pixels of a predetermined size, and outputs the blocks to the code amount allocation unit 220 and the compression unit 230 (step S11). In this embodiment, it will be assumed that the block to be compressed has a horizontal 4-pixel format (unit of 4×1 pixel). Here, the format of the block to be compressed is not limited to the horizontal 4-pixel but may be different, for example horizontal 8-pixel, horizontal 16-pixel, or 2×2 square.

The code amount allocation unit 220 allocates the code amount with respect to each of the inputted blocks to be compressed (step S12).

The difference calculation unit 221 of the code amount allocation unit 220 calculates the difference absolute value between each of the pixels constituting the block to be compressed and the adjacent pixel, and outputs the values to the comparison unit 222.

The comparison unit 222 of the code amount allocation unit 220 extracts the largest one of the difference absolute values outputted from the difference calculation unit 221, and determines the code amount to be allocated to the luminance component and the color difference component through comparison between the extracted difference absolute value and the threshold.

In this embodiment, it will be assumed that the threshold is set as 16. The comparison unit 222 according to this embodiment adopts 4 bits (corresponding to the first code amount) as the code amount to be allocated to the luminance component and 6 bits (corresponding to the second code amount) as the code amount to be allocated to the color difference component, in the case where the maximum difference absolute value is equal to or smaller than 16, but adopts 6 bits as the code amount to be allocated to the luminance component and 4 bits as the code amount to be allocated to the color difference component in the case where the maximum difference absolute value is larger than 16, and then outputs the code amount adopted as above to the compression unit 230 as allocation information. Here, since the compression unit 230 performs the fixed length compression, the allocation information may only indicate the allocation amount for either of the luminance component or the color difference component, or may indicate the allocation amount for both. In the case where three or more components are involved, it suffices that the allocation information contains the allocation amount for at least two of the components.

In the compression unit 230, the pixel encoding unit 231 quantizes the luminance component and the color difference component of the pixels constituting the block to be compressed that has been inputted according to the code amount indicated by the allocation information outputted from the code amount allocation unit 220, and outputs pixel encoded data including the encoded data of the luminance component and that of the color difference component (part of step S13). In the quantization process, for example when a component of 10 bits is to be compressed to 4 bits, only the data of the upper 4 bits may be extracted after adding 1 to the fifth bit from the top, and the lower 6 bits may be deleted.

The difference encoding unit 232 calculates a difference value of the components between the adjacent pixels, and encodes the difference value according to the code amount indicated by the allocation information outputted from the code amount allocation unit 220 (part of step S13). Here, for encoding the first pixel of the current block to be compressed, the data of the fourth pixel of the block to be compressed inputted immediately before the current block to be compressed is employed. In other words, the difference encoding unit 232 employs, in addition to the data of the plurality of components of the plurality of pixels constituting the block to be compressed, the decoded data obtained by decoding the encoded data (compressed data) of the fourth pixel of the immediately preceding block to be compressed outputted from the difference decoding unit 234 or the pixel decoding unit 233 through the compression mode decision unit 235, for the generation of the encoded data.

For the encoding of the first pixel of the block to be compressed, first a difference value from the pixel data of the fourth pixel in the immediately preceding block which has been decoded is calculated. Then a clipping process is performed according to the code amount determined by the code amount allocation unit 220, and the encoded data of the first pixel is outputted. In the clipping process, for example when a difference value of 10 bits is to be compressed to 4 bits, a difference value equal to or smaller than −8 is clipped to −8 (1111), and a difference value equal to or larger than 7 is clipped to 15 (0111).

With respect to the nth (n=2, 3, 4) pixel of the block to be compressed, a difference value from the decoded data obtained by decoding the encoded data of the (n−1)th pixel of the block to be compressed is calculated. Then the clipping process is performed as with the first pixel, to thereby output the encoded data of the nth pixel.

The pixel decoding unit 233 inversely quantizes the pixel encoded data so as to decode into the pixel data and generate the decoded data, and outputs the decoded data to the compression mode decision unit 235. In the inverse quantization, for example when encoded data of 4 bits is to be decompressed to 10 bits, the encoded data may be applied to the upper 4 bits of the pixel data, and 0 or 1, or the encoded data may be applied to the lower 6 bits.

The difference decoding unit 234 retains the decoded data of the immediately preceding pixel, and adds decoded data of the difference encoded data to the immediately preceding pixel data to thereby generate the decoded data, and outputs the decoded data to the compression mode decision unit 235.

The compression mode decision unit 235 calculates, when the pixel decoding unit 233 outputs the decoded data, a first difference between the pixel data (inputted pixel data) of the corresponding pixel of the block to be compressed inputted to the compression unit 230 and the decoded data outputted from the pixel decoding unit 233. Likewise, the compression mode decision unit 235 also calculates, when the difference decoding unit 234 outputs the decoded data, a second difference between inputted pixel data of the corresponding pixel and the decoded data outputted from the difference decoding unit 234. Then the compression mode decision unit 235 compares the first difference and the second difference and identifies the encoding unit corresponding to the smaller difference, between the pixel encoding unit 231 and the difference encoding unit 232 (step S14). In addition, the compression mode decision unit 235 outputs the decoded data from the encoding unit identified as above to the difference encoding unit 232, so that the decoded data is utilized for the encoding of the upcoming pixel data.

Although the compression mode decision unit 235 according to this embodiment is configured to calculate, with respect to each pixel, the difference between the decoded data outputted from the pixel decoding unit 233 and the inputted pixel data (first difference) as well as the difference between the decoded data outputted from the difference decoding unit 234 and the inputted pixel data (second difference), to thereby identify the encoding unit that has produced the smaller error, different methods may be adopted. For example, the decision may be made with respect to each block to be compressed. More specifically, for example the first difference and the second difference may be calculated with respect to all the pixels constituting the block to be compressed, to thereby select the encoding unit corresponding to the smallest maximum error, or select the encoding unit that has produced the lowest average value of the difference (error).

The selection unit 236 selectively outputs the encoded data from the encoding unit identified by the compression mode decision unit 235 to the memory control unit 15 through the bus line 11.

[Threshold Setting by Image Compression Unit 200]

Figure 7:
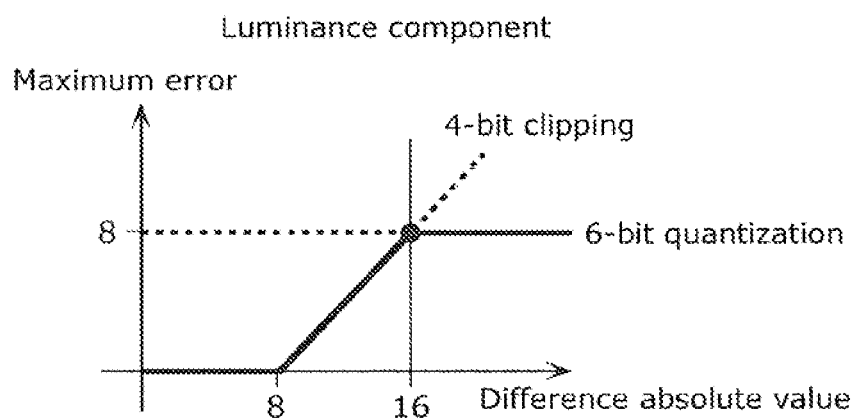
FIG. 7 is a graph showing a maximum error produced upon performing 4-bits difference encoding and 6-bits pixel encoding with respect to a luminance component.

Referring now to FIG. 7, a threshold setting process performed by the code amount allocation unit 220 of the image compression unit 200 will be described hereunder. In this embodiment the threshold is set at a fixed value in the image processing unit 10 in the manufacturing process thereof, the image processing unit 10 may be configured so as to allow a threshold to be set as desired from outside.

In this embodiment, the threshold is determined such that a maximum error between a luminance value of pixel data of pixels constituting a block to be compressed inputted and a luminance value of the pixel data subjected to compression becomes smallest, on the basis of a plurality of encoding methods, namely the difference encoding and the pixel encoding.

Further details will be described referring to FIG. 7. In the difference encoding process, in the case where the difference absolute value of the luminance component from the immediately preceding pixel (adjacent pixel) is equal to or lower than a maximum value that can be expressed by the code amount after the compression, the maximum error between the difference absolute values before and after the compression becomes zero (bold line not exceeding 8 along the difference absolute value in FIG. 7). In contrast, in the case where the difference absolute value of the luminance component from the adjacent pixel larger than the maximum value after the compression, the maximum error becomes larger with the increase in difference of the luminance value between the pixels, since the difference absolute value after the compression is clipped to the maximum value after the compression (bold line between 8 and 16 of the difference absolute value and broken line beyond 16 thereof in FIG. 7). In the case where, for example, the code amount of 4 bits is allocated after the compression in the difference encoding process, a maximum value that can be expressed with the code amount after the compression is between −8 and 7. Accordingly, the transition of the maximum error in the difference encoding process can be expressed as the lines representing 4-bit clipping in FIG. 7 namely the bold lines up to 16 of the difference absolute value and broken line beyond 16 thereof, in which the maximum error remains zero in the region where the difference absolute value is equal to or smaller than 8 bits, and increases in proportion to the difference absolute value in the region beyond 8 bits.

On the other hand, in the case of the pixel encoding process the maximum error remains constant irrespective of the difference absolute value. In the case where the code amount of 6 bits is allocated after the compression in the image compression process, the maximum error becomes 8 since the lower 4 bits are rounded in the 6-bit quantization. Accordingly, the transition of the maximum error in the pixel encoding process can be expressed as the lines representing 6-bit quantization in FIG. 7, namely the broken lines between 0 and 16 of the difference absolute value and the bold line beyond 16 thereof.

Thus, when the maximum difference absolute value is equal to or lower than the threshold (allocation of the code amount is 4 bits in this embodiment), the maximum error generally becomes smaller by the difference encoding method, and when the maximum difference absolute value is larger than the threshold (allocation of the code amount is 6 bits in this embodiment), the maximum error generally becomes smaller by the pixel encoding method. Therefore, on the basis of FIG. 7, the intersection at 16, between the "4-bit clipping" lines representing the maximum error produced by the difference encoding method with the code amount allocation of 4 bits and the "6-bit quantization" lines representing the maximum error produced by the pixel encoding method with the code amount allocation of 6 bits, is determined as the threshold. With such setting, the maximum error can be suppressed not to exceed 8 by performing the difference encoding with the code amount allocation of 4 bits in the case where the difference absolute value is equal to or smaller than 16, and maintained at 8 by performing the pixel encoding with the code amount allocation of 6 bits in the case where the difference absolute value is larger than 16.

[Relationship Between Maximum Error and Difference Absolute Value]

Hereunder, a relationship between the maximum error and the difference absolute value will now be described with respect to the cases where the code amount allocation to the luminance component and the color difference component is set as (4 bits:6 bits) and (6 bits:4 bits), referring to FIGS. 8A, 8B, 9A, and 9B.

Figure 8A:
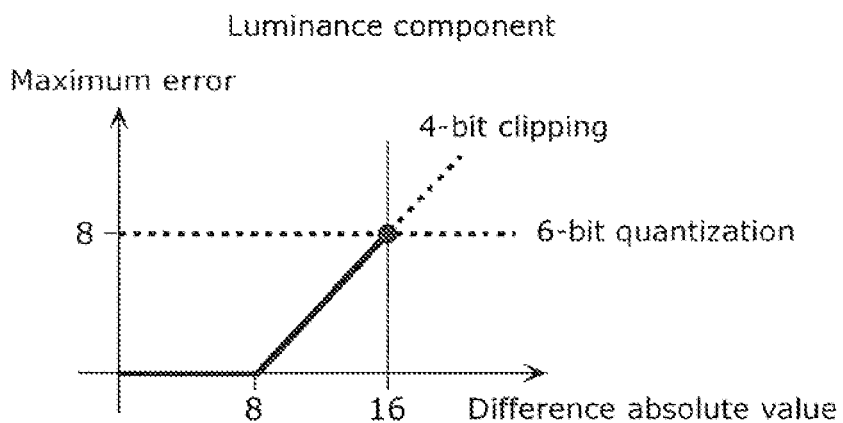
FIG. 8A is a graph showing a relationship between a difference absolute value and the maximum error in the case of allocating 4 bits to a luminance component.
Figure 8B:
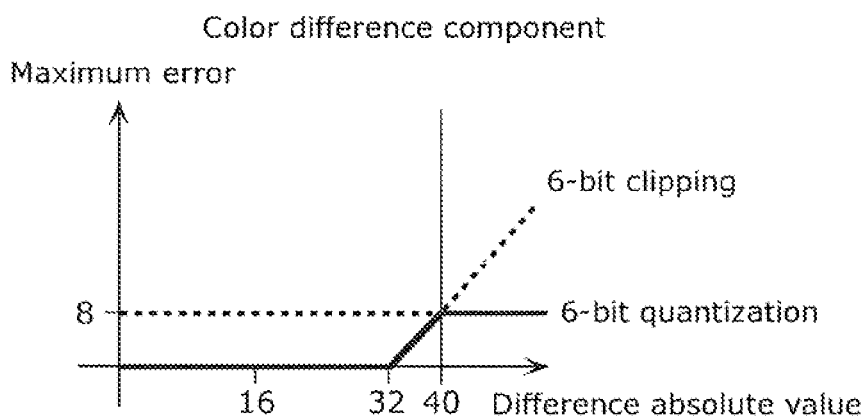
FIG. 8B is a graph showing a relationship between a difference absolute value and the maximum error with the color difference component of 6 bits.

First, the case will be described where the difference absolute value of the luminance component is equal to or smaller than 16, i.e., the code amount is allocated to the luminance component and the color difference component in the ratio of (4 bits:6 bits). FIG. 8A is a graph showing by bold lines a relationship between the difference absolute value and the maximum error of the luminance component in the case of allocating the code amount to the luminance component and the color difference component in the ratio of (4 bits:6 bits). In FIG. 8A, a horizontal broken line at 8 of the maximum error represents the maximum error produced upon performing the pixel encoding with the code amount of 6 bits. The bold lines in the region where the difference absolute value is equal to or smaller than 16 and the oblique broken line in the region where the difference absolute value is larger than 16 represent the maximum error produced upon performing the difference encoding with the code amount of 4 bits. FIG. 8B is a graph showing by bold lines a relationship between the difference absolute value and the maximum error of the color difference component in the case of allocating the code amount to the luminance component and the color difference component in the ratio of (4 bits:6 bits). In FIG. 8B, a horizontal broken line and a horizontal bold line at 8 of the maximum error represent the maximum error produced upon performing the pixel encoding with the code amount of 6 bits. The bold lines in the region where the difference absolute value is equal to or smaller than 40 and the broken line in the region where the difference absolute value is larger than 40 represent the maximum error produced upon performing the difference encoding with the code amount of 4 bits.

As shown in FIG. 8A, the maximum error of the luminance component remains zero when the difference absolute value is 0 to 8, and increases in proportion to the difference absolute value when the difference absolute value is 8 to 16.

In contrast, as shown in FIG. 8B, the smaller value of the "6-bit clipping" line representing the difference encoding with the code amount of 6 bits and the "6-bit quantization" line representing the pixel encoding with the code amount of 6 bits is taken as the maximum error of the color difference component. In other words, the maximum error can be suppressed not to exceed 8 by performing the difference encoding with the code amount of 6 bits in the case where the difference absolute value of the color difference signal is equal to or smaller than 40 and by performing the pixel encoding with the code amount of 6 bits in the case where the difference absolute value is larger than 40.

Figure 9A:
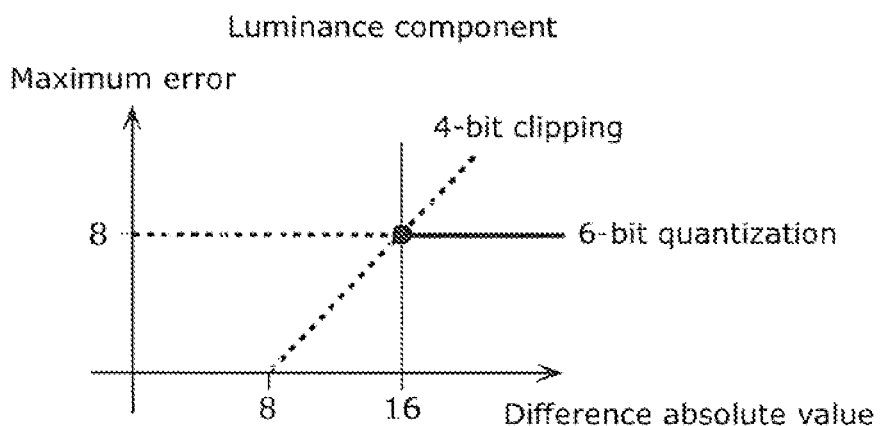
FIG. 9A is a graph showing a relationship between a difference absolute value and the maximum error in the case of allocating 6 bits to a luminance component.
Figure 9B:
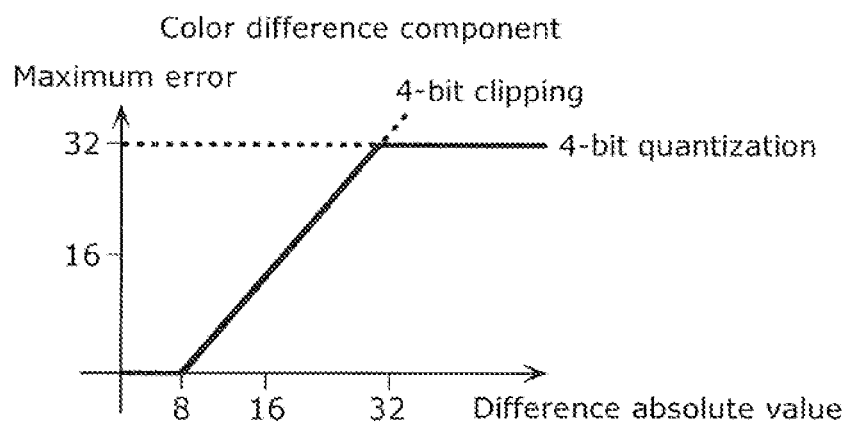
FIG. 9B is a graph showing a relationship between a difference absolute value and the maximum error with the color difference component of 4 bits.
Figure 10:
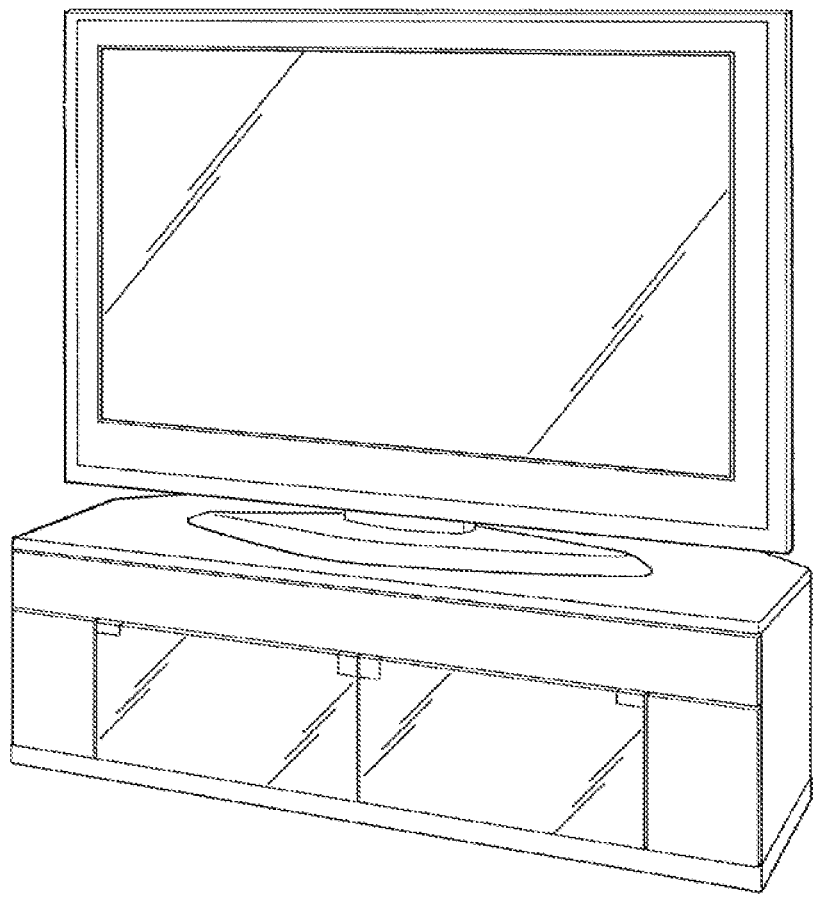
FIG. 10 is a perspective view showing an appearance of a DTV system.
Figure 11:
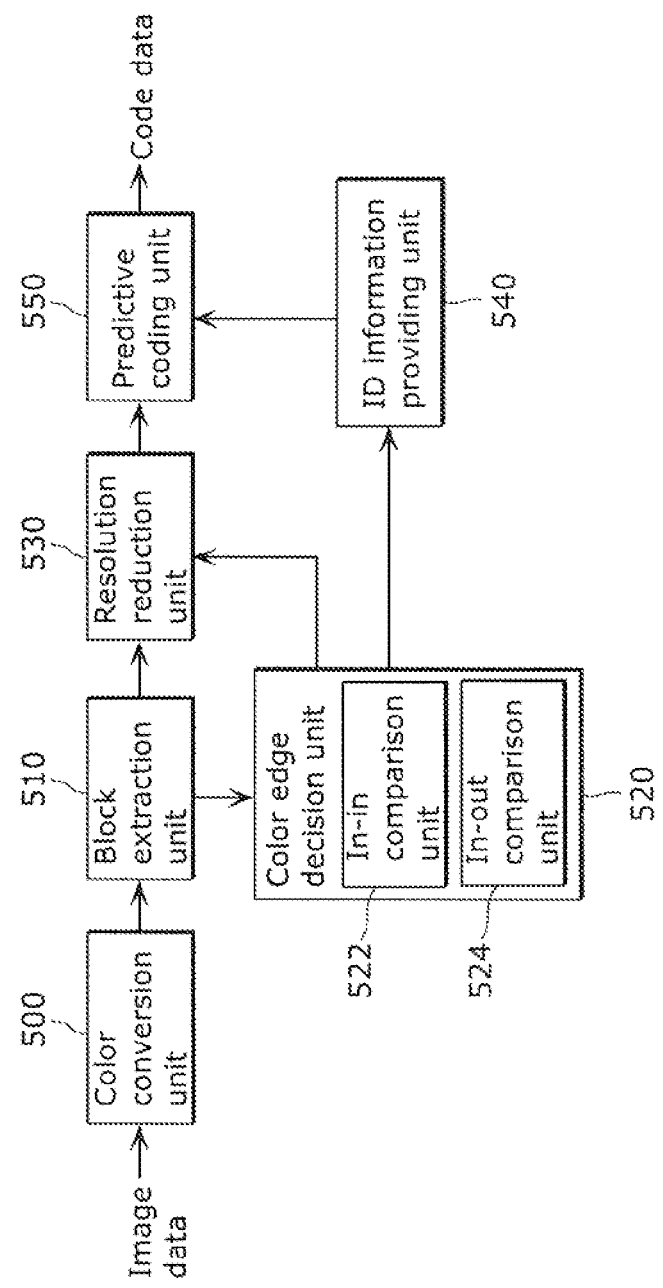
FIG. 11 is a block diagram showing a configuration of a conventional image compression device.

Description will now be made regarding the case where the difference absolute value of the luminance component is larger than 16, i.e., the code amount is allocated to the luminance component and the color difference component in the ratio of (6 bits:4 bits). FIG. 9A is a graph showing by a bold line a relationship between the difference absolute value and the maximum error of the luminance component in the case of allocating the code amount to the luminance component and the color difference component in the ratio of (6 bits:4 bits). In FIG. 9A, a horizontal broken line and the bold line at 8 of the maximum error represent the maximum error produced upon performing the pixel encoding with the code amount of 6 bits. The oblique broken line represents the maximum error produced upon performing the difference encoding with the code amount of 4 bits. FIG. 9B is a graph showing by bold lines a relationship between the difference absolute value and the maximum error of the color difference component in the case of allocating the code amount to the luminance component and the color difference component in the ratio of (6 bits:4 bits). In FIG. 9B, the bold line in the region where the difference absolute value is equal to or smaller than 32 and the broken line in the region where the difference absolute value is larger than 32 represent the maximum error produced upon performing the difference encoding with the code amount of 4 bits. In addition, the broken line in the region where the difference absolute value is equal to or smaller than 32 and the bold line in the region beyond 32 represent the maximum error produced upon performing the pixel coding with the code amount of 4 bits.

As shown in FIG. 9A, the maximum error of the luminance component is 8.

In contrast, as shown in FIG. 9B, the smaller value of the "4-bit clipping" line representing the difference encoding with the code amount of 4 bits and the "4-bit quantization" line representing the pixel encoding with the code amount of 4 bits is taken as the maximum error of the color difference component. In other words, the maximum error can be suppressed not to exceed 32 by performing the difference encoding with the code amount of 4 bits in the case where the difference absolute value of the color difference signal is equal to or smaller than 32 and by performing the pixel encoding with the code amount of 4 bits in the case where the difference absolute value is larger than 32.

Thus, in this embodiment, the accuracy of the color difference component can be improved by increasing the code amount for the color difference component, provided that the fluctuation of the luminance component is small. More specifically, by the conventional method the code amount, is allocated to the luminance component and the color difference component not according to the luminance component but in a fixed ratio of, for example, (6 bits:4 bits), and therefore the maximum error of the color difference component reaches 32 even when the fluctuation of the luminance components is equal to or smaller than 16. In contrast, as stated above, the arrangement according to this embodiment suppresses the maximum error of the color difference component not to exceed 8 in the case where the fluctuation of the luminance components is equal to or smaller than 16.

As described thus far, the image compression device according to this embodiment is configured to appropriately change the code amount to be allocated to the luminance component and the color difference component according to the difference in luminance component between a pixel and another pixel adjacent thereto, when compressing the inputted pixel data. Therefore, even when the color difference components in the data to be processed are decimated in advance as in motion pictures, the color difference component can be prevented from suffering further degradation provided that the difference between the luminance components is small. In the case where the fluctuation of the luminance components is small, increasing the code amount for the color difference component prevents emergence of color gradation or a color edge.

Variations of Embodiment (1) Although the code amount allocation unit 220 according to the foregoing embodiment is configured to compare the maximum absolute value of the difference between the luminance components with the threshold when deciding the allocation of the code amount, different arrangements may be adopted. For example, the code amount allocation unit 220 may compare the average of the difference absolute value with the threshold.

Alternatively, the code amount allocation unit 220 may be configured to compare the maximum pixel value with the threshold, instead of the difference of the luminance components.

For the comparison between the maximum absolute value of the difference between the luminance components and the threshold, it is preferable that the compression unit 230 includes the difference encoding unit 232. Likewise, for the comparison between the maximum pixel value and the threshold, it is preferable that the compression unit 230 includes the pixel encoding unit 231.

(2) Although the code amount allocation unit 220 according to the foregoing embodiment is configured to allocate the code amount to the luminance component and the color difference component in the ratio of (4 bits:6 bits) or (6 bits:4 bits), different ratios may be adopted. The ratio of the code amount allocation may be, for example, (7 bits:3 bits), and three or more code amounts may be prepared, instead of two.

(3) The code amount allocation unit 220 according to the foregoing embodiment may be configured to switch the allocation mode on the basis of the characteristic (type) of the image to be processed.

More specifically, for example, a first mode in which the code amount is allocated to the luminance component and the color difference component in the ratio of (4 bits:6 bits) or (6 bits:4 bits) and a second mode in which the code amount is allocated to the luminance component and the color difference component in a ratio of (7 bits:3 bits) or (6 bits:4 bits) may be introduced. Then the first mode may be selected in the case where the color difference components of the inputted data (block to be compressed) are largely decimated, and the second mode may be selected in the case where the color difference components of the inputted data (block to be compressed) are only slightly decimated.

(4) Although the compression unit 230 according to the foregoing embodiment is configured to generate the encoded data by two encoding methods, namely utilizing the pixel encoding unit 231 to perform the pixel encoding by quantization and utilizing the difference encoding unit 232 to perform the difference encoding, different methods may be adopted. A plurality of pixel encoding methods including the quantization and the difference encoding method may be combined so as to generate the encoded data, or different types of encoding method may be adopted to generate the encoded data.

Alternatively, the compression unit 230 may be configured to generate the encoded data by a single encoding method.

(5) Although the luminance component and the color difference component are taken up as components constituting a color space in the foregoing embodiment, different combinations may be adopted provided that the luminance component is included. Examples of other components other than the luminance component include, in addition to the color difference component, a hue component and a chroma component.

(6) Although the code amount allocation unit 220 according to the foregoing embodiment includes the blocking unit 210, the blocking unit 210 may be excluded. In this case, the data inputted to the image compression unit 200 is handled as the data to be compressed.

(7) In the foregoing embodiment, the functional blocks shown in FIG. 1, such as the image signal processing unit 16, the decoder 14, the memory control unit 15, and so forth, are typically realized as a large scale integration (LSI) which is a type of integrated circuit. The functional blocks may be individually implemented in separate chips, or a single chip may include a part or whole of the functional blocks. Although the term of LSI is adopted above, the device may be named as an IC, a super LSI, or an ultra LSI, depending on the level of integration.

(8) In addition, the integration may be achieved by an exclusive circuit or a general-use processor, instead of employing the LSI. After manufacturing the LSI, a field programmable gate array (FPGA), or a reconfigurable processor that accepts reconfiguration of connection or setting of circuit cells inside the LSI may be employed.

(9) Further, in the case where an integration technique that can be substituted for the LSI is developed through advancement of semiconductor technology or another technique deriving therefrom, naturally such new technique may be introduced for integrating the functional blocks. An example of such possibility is application of biochemical technology.

(10) The constituents cited in the foregoing embodiment may be realized as an exclusive hardware. Those constituents that can be realized by software may be realized by execution of a program.

Although the embodiment of the present invention has been described with reference to the drawings, it is to be understood that the present invention is in no way limited to the foregoing embodiment. Various modifications may be made to the embodiment within the scope of the present invention or equivalents thereof.

INDUSTRIAL APPLICABILITY

To perform fixed length compression of image data composed of a plurality of components including a luminance component, the image compression device according to the present invention increases the allocation of code amount to components other than the luminance component in the case where fluctuation of the luminance components is small, and thus prevents emergence of color gradation or a color edge. Therefore, the present invention contributes to reducing the amount of data to be stored in a memory, and is hence beneficially applicable to image processing units designed for processing high-resolution image data.

REFERENCE SIGNS LIST

1 DTV system
10 Image processing unit
12 Stream controller
13 CPU
14 Decoder
15 Memory control unit
16 Image signal processing unit
20 Front end
30 External memory
40 Display
161 Image processing/synthesizing unit 162 Image compression/decompression unit
200 Image compression unit
210 Blocking unit
220 Code amount allocation unit
221 Difference calculation unit
222 Comparison unit
230 Compression unit
231 Pixel encoding unit
232 Difference encoding unit
233 Pixel decoding unit
234 Difference decoding unit
235 Compression mode decision unit
236 Selection unit

The invention claimed is:

1. An image compression device that performs fixed length compression of data to be compressed composed of a plurality of components including a luminance component, the image compression device comprising:
a code amount allocation unit configured to determine, according to the luminance component, the code amount to be allocated to each of the plurality of components such that a total of the code amount allocated to each of the components remains constant; and
a compression unit configured to compress each of the plurality of components according to the code amount determined by the code amount allocation unit,
wherein the code amount allocation unit:
includes a difference calculation unit configured to calculate, with respect to each of pixels constituting the data to be compressed, an absolute value of a difference between the luminance component of one of the pixels and the luminance component of another pixel adjacent to the one pixel; and
is configured to determine the code amount to be allocated according to the absolute value of the difference calculated by the difference calculation unit.

2. The image compression device according to claim 1, wherein the code amount allocation unit is configured to determine the code amount to be allocated according to a maximum absolute value of the difference calculated by the difference calculation unit.

3. The image compression device according to claim 2, wherein the code amount allocation unit further includes a comparison unit configured to compare the maximum absolute value of the difference calculated by the difference calculation unit with a predetermined threshold, and adopt a first code amount as the code amount to be allocated to the luminance component when the maximum absolute value is equal to or lower than the threshold and adopt a second code amount as the code amount to be allocated to the luminance component when the maximum absolute value is larger than the threshold.

4. The image compression device according to claim 3, wherein the code amount allocation unit is configured to determine the code amount to be allocated such that the code amount to be allocated to the plurality of components other than the luminance component in the case of allocating the first code amount to the luminance component becomes larger than the code amount to be allocated to the plurality of components other than the luminance component in the case of allocating the second code amount to the luminance component.

5. The image compression device according to claim 1, wherein the code amount allocation unit is configured to determine the code amount to be allocated on the basis of a characteristic of the data to be compressed, in addition to the luminance component.

6. The image compression device according to claim 5, wherein the code amount allocation unit is configured to determine the code amount to be allocated such that the smaller code amount is allocated to the luminance component, the smaller the absolute value of the difference between the luminance components is, and the larger the decimation amount of components in the data to be compressed other than the luminance component is.

7. The image compression device according to claim 3, wherein the compression unit includes:
an encoding unit configured to perform a plurality of encoding processes different from each other to generate a plurality of types of encoded data;
a decoding unit configured to decode the plurality of encoded data to thereby generate a plurality of decoded data;
a compression mode decision unit configured to calculate, with respect to each of the plurality of decoded data, a difference between the decoded data and the data to be compressed and designate one of the plurality of encoded data on the basis of the difference; and
a selection unit configured to select the encoded data designated by the compression mode decision unit and output the encoded data.

8. The image compression device according to claim 7, wherein the comparison unit is configured to determine the code amount to be allocated to the luminance component through comparison between the maximum absolute value of the difference and the threshold determined on the basis of a maximum error produced upon applying the plurality of encoding processes to the luminance component.

9. An image compression method for performing fixed length compression of data to be compressed composed of a plurality of components including a luminance component, the method comprising:
determining, using a code amount allocation unit, according to the luminance component, the code amount to be allocated to each of the plurality of components such that a total of the code amount allocated to each of the components remains constant; and
compressing, a compression unit, each of the plurality of components according to the code amount determined in the determining of the code amount,
wherein said determining comprises:
calculating, with respect to each of pixels constituting the data to be compressed, an absolute value of a difference between the luminance component of one of the pixels and the luminance component of another pixel adjacent to the one pixel; and
determining the code amount to be allocated according to the absolute value of the difference calculated in said calculating.

10. An integrated circuit for use in an image compression device that performs fixed length compression of data to be compressed composed of a plurality of components including a luminance component, the integrated circuit comprising:
a code amount allocation unit configured to determine, according to the luminance component, the code amount to be allocated to each of the plurality of components such that a total of the code amount allocated to each of the components remains constant; and
a compression unit configured to compress each of the plurality of components according to the code amount determined by the code amount allocation unit, wherein the code amount allocation unit:
includes a difference calculation unit configured to calculate, with respect to each of pixels constituting the data to be compressed, an absolute value of a difference between the luminance component of one of the pixels and the luminance component of another pixel adjacent to the one pixel; and
is configured to determine the code amount to be allocated according to the absolute value of the difference calculated by the difference calculation unit.

11. A non-transitory computer-readable recording medium for use in a computer, the recording medium having a computer program recorded thereon for causing a computer to perform fixed length compression of data to be compressed composed of a plurality of components including a luminance component, the program comprising:
determining, according to the luminance component, the code amount to be allocated to each of the plurality of components such that a total of the code amount allocated to each of the components remains constant; and
compressing each of the plurality of components according to the code amount determined by the code amount allocation unit,
wherein said determining comprises:
calculating, with respect to each of pixels constituting the data to be compressed, an absolute value of a difference between the luminance component of one of the pixels and the luminance component of another pixel adjacent to the one pixel; and
determining the code amount to be allocated according to the absolute value of the difference calculated in said calculating.

12. A picture display apparatus including an image compression device that performs fixed length compression of data to be compressed composed of a plurality of components including a luminance component, the picture display apparatus comprising:
a memory that stores therein compressed data obtained through the fixed length compression of the data to be compressed performed by the image compression device; and
an image signal processing unit configured to perform a predetermined image processing on the basis of decoded data obtained by decoding the compressed data and output the data obtained through the image processing to a predetermined display panel,
wherein the image compression device includes:
a code amount allocation unit configured to determine, according to the luminance component, the code amount to be allocated to each of the plurality of components such that a total of the code amount allocated to each of the components remains constant; and
a compression unit configured to compress each of the plurality of components in accordance with the code amount determined by the code amount allocation unit, and output the compressed components to the memory,
wherein the code amount allocation unit:
includes a difference calculation unit configured to calculate, with respect to each of pixels constituting the data to be compressed, an absolute value of a difference between the luminance component of one of the pixels and the luminance component of another pixel adjacent to the one pixel; and
is configured to determine the code amount to be allocated according to the absolute value of the difference calculated by the difference calculation unit.

* * * * *